United States Patent
Irshad

(10) Patent No.: US 12,140,340 B1
(45) Date of Patent: *Nov. 12, 2024

(54) POWER SYSTEM WITH PHASE CHANGE MATERIAL

(71) Applicant: KING FAHD UNIVERSITY OF PETROLEUM AND MINERALS, Dhahran (SA)

(72) Inventor: Kashif Irshad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,543

(22) Filed: Jul. 23, 2024

Related U.S. Application Data

(63) Continuation of application No. 17/964,976, filed on Oct. 13, 2022, now Pat. No. 12,092,360.

(51) Int. Cl.
| | |
|---|---|
| *F24F 5/00* | (2006.01) |
| *F25B 27/00* | (2006.01) |
| *F25B 40/00* | (2006.01) |
| *H02S 10/00* | (2014.01) |
| *H02S 20/20* | (2014.01) |

(52) U.S. Cl.
CPC .......... *F24F 5/0021* (2013.01); *F25B 27/005* (2013.01); *F25B 40/00* (2013.01); *H02S 10/00* (2013.01); *H02S 20/20* (2014.12); *F24F 2005/0025* (2013.01)

(58) Field of Classification Search
CPC ............ F24F 5/0021; F24F 2005/0067; F24F 2005/0064; F24F 2005/0025; H02S 10/00; F25B 25/005; F25B 27/005
See application file for complete search history.

(56) References Cited

U.S. PATENT DOCUMENTS

| | | | |
|---|---|---|---|
| 5,680,898 A | 10/1997 | Rafalovich et al. | |
| 7,363,772 B2 | 4/2008 | Narayanamurthy | |
| 9,389,007 B1 | 7/2016 | McKay | |
| 10,883,772 B2 | 1/2021 | Alsadah et al. | |
| 2002/0007637 A1* | 1/2002 | Simmons | F25B 9/14 62/430 |

(Continued)

FOREIGN PATENT DOCUMENTS

IN 201811012872 A 12/2019

*Primary Examiner* — David J Teitelbaum
(74) *Attorney, Agent, or Firm* — Oblon, McClelland, Maier & Neustadt, L.L.P.

(57) ABSTRACT

A solar photovoltaic powered phase change material thermal energy storage system includes a refrigerator unit having a phase change material (PCM) tank and a photovoltaic (PV) panel to provide electrical energy to the PCM tank to melt a PCM stored therein. The PCM tank includes a refrigeration coil immersed in the PCM and configured to circulate refrigerant to between the PCM tank and a condenser. Energy released and absorbed during solidification and melting of the PCM is used to support an air-conditioning (AC) unit and substitute power used by a compressor of the AC unit, to handle demand during peak hours, thereby reducing overall power requirement of a facility. The melting of the PCM is also controlled, so that the AC unit may operate with the aid of the PCM for longer duration during the day.

20 Claims, 9 Drawing Sheets

(56) References Cited

U.S. PATENT DOCUMENTS

2012/0047891 A1* 3/2012 Rosenfeld .............. F25B 40/00
                                                                      60/659
2016/0339761 A1* 11/2016 Enomoto .......... B60H 1/00899
2021/0364172 A1 11/2021 Albakri

* cited by examiner

POWER SYSTEM WITH PHASE CHANGE MATERIAL

CROSS-REFERENCE TO RELATED APPLICATIONS

The present application is a Continuation of U.S. application Ser. No. 17/964,976, now allowed, having a filing date of Oct. 13, 2022.

BACKGROUND

Technical Field

The present disclosure relates to an air conditioning system for cooling an interior space of a facility and more particularly relates to a thermal energy storage system that utilizes a phase change material to support operation of the air conditioning system.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Refrigeration systems are known in heating, ventilation, air conditioning and refrigeration arts, and operate to compress and circulate a refrigerant throughout a closed-loop heat transfer fluid circuit by a connecting plurality of components, to transfer heat away from and/or to a fluid, such as air, in a climate-controlled space with an air conditioning system, or alternatively to a secondary heat transfer fluid to be delivered to a climate-controlled space. One common example of refrigerant systems is an air conditioning (AC) system, which operates to condition (cool and often dehumidify) air to be delivered into the climate-controlled space. Other examples may include refrigeration systems for various applications requiring refrigerated environments.

Due to drastic changes in weather conditions, especially in hot and dry countries, use of the AC systems are largely known for space conditioning purposes. According to International Energy Agency (IEA 2019) data, in the year 2019, almost 1.6 billion AC systems are running globally in order to provide thermal comfort to occupants resulting in consumption of approximately 6% of an overall final energy output. Out of overall electricity production in hot and dry countries, a large percentage of the energy is consumed by buildings for space conditioning. Thus, there lies a need for alternative or additional cooling systems that are capable of reducing the burden of energy intensive AC systems.

In order to address such needs and with the development of technology, phase change materials (PCM's) have been used in refrigerant systems to act as a thermal buffer during thermal transfer operations, to shift thermal loads between peak and low demand cycles, and/or to provide rapid responsive performance during peak system loads. For air conditioning applications on commercial rooftop buildings, a PCM having a melting temperature in range of 5° C. to 10° C. is considered as optimum [See: M. M. Farid, A. M. Khudhair, S. A. K. Razack, and S. Al-Hallaj, "A review on phase change energy storage: Materials and applications," Energy Conversion and Management. 2004].

CN203375592U describes a phase changing energy storage air conditioner characterized in that a plate type heat exchanger, a controller, and a phase changing energy storage tank made of phase changing materials are arranged inside an indoor unit, a temperature collector is arranged inside the plate type heat exchanger and is connected with the input end of the controller, and the output end of the controller is connected with the compressor. The indoor temperature can be controlled by exchanging between cold in the natural environment, night temperature differences in the natural environment, and the latent heat of the phase changing materials.

US20080022713A1 describes a demand shifting thermal storage system employing a heat transfer/thermal energy storage vessel to produce and hold a phase change fluid using an air cooled/water coupled or evaporative condensing unit to generate cold fluid with a separate and dependent circuit coupled to an indoor cooling load to remove heat from an HVAC or process cooling load using one or multiple indoor coils to absorb heat, then returning the heat to the thermal energy storage vessel to reject the space heat, cool the space, and continue the cycle.

U.S. Pat. No. 7,096,929B2 describes a PCM system and method of shifting peak electrical load. The PCM system includes a heat exchanger, a storage tank coupled to the heat exchanger for storing PCM slurry, a pump coupled to the heat exchanger, an air conditioning unit coupled to the heat exchanger, and a heat rejection unit coupled to the storage tank. PCM slurry is pumped from the storage tank to the heat exchanger. The energy at the heat exchanger is absorbed by the PCM slurry, and the PCM slurry is then returned to the storage tank. The energy absorbed by the PCM is rejected from the storage tank to a ground loop or by an air conditioning unit during a non-peak or less load demand period.

None of the aforementioned patent references describes use of photovoltaic (PV) panel to power a PCM tank, to thereby reducing overall energy consumption and cost of the system. Accordingly, it is one object of the present disclosure to provide a system configured to overcome a state of temperature-based discomfort within buildings, by utilizing minimum energy to operate and control building environment, compared to conventional systems.

SUMMARY

According to one aspect of the present disclosure, a solar photovoltaic powered phase change material thermal energy storage (SPCMBOX) system is disclosed. The system includes a refrigerator unit, an ethylene glycol (EG) flow unit, an air handling unit, and an air conditioning (AC) unit. The refrigerator unit includes a photovoltaic (PV) panel, a phase change material (PCM) tank, a cooling fan assembly, a first compressor, a refrigeration pump housed within the first compressor, a first condenser, a first expansion valve, and an evaporator. wherein the PV panel provides electrical energy to the first compressor to cool a PCM material housed within the PCM tank. The PV panel is directly adjacent and covers a top side of the PCM tank. The PCM tank is in thermal communication with the first condenser through a refrigeration coil and is configured to flow a refrigerant from the PCM tank to the first condenser via the refrigeration pump. The PCM tank further comprises a door, at least 20 ventilation vents, and a drainage passage. The refrigeration pump is housed inside a same compartment as the compressor. The refrigeration coil in the PCM tank is immersed in the PCM material and configured to circulate the refrigerant to the PCM tank and the first condenser. The cooling fan assembly is positioned proximal to the first condenser. The EG flow unit includes a heat exchanger, a pump, and a fan coil. The air handling unit includes an AC evaporator and two three-way valves, where a first three-way valve directs hot air through the AC evaporator and a second three-way valve directs hot air through the fan coil. The AC unit includes a second compressor, a second condenser, and a second expansion valve.

In some embodiments, the refrigeration coil is fabricated of copper and housed in a thermal energy storage (TES) tank disposed within the PCM tank.

In some embodiments, the refrigeration coil housed in the TES tank within the PCM tank is configured to absorb heat from the PCM to minimize heat gain.

In some embodiments, the refrigerant circulates through the refrigeration coil and is configured to absorb heat from the PCM within the PCM tank.

In some embodiments, a thermostat is disposed within the PCM tank to monitor a PCM temperature of the PCM within the PCM tank.

In some embodiments, the first condenser is in fluid communication with the evaporator by circulation of the refrigerant from the evaporator to the first condenser via the refrigeration pump.

In some embodiments, a cooling coil is disposed within the evaporator to receive the refrigerant from the first condenser.

In some embodiments, a temperature sensor is attached to an outlet of the air handling unit to measure an exit temperature of an air stream from the air-handling unit.

In some embodiments, the refrigerant is an ethylene-glycol water solution. In some embodiments, the ethylene-glycol water solution contains an amount of water of from 50 weight percent (wt. %) to 70 wt. % of the ethylene-glycol water solution and an amount of ethylene glycol of from 30 weight percent (wt. %) to 50 wt. % of the ethylene-glycol water solution.

In some embodiments, the ethylene-glycol water solution contains at least one component selected from the group consisting of copper oxide, aluminum dioxide, titanium dioxide, silicon dioxide, graphite, silicon carbide, and carbon nanotubes.

In some embodiments, the refrigerator unit further includes a battery bank to maintain stability in energy supply during operation. In some embodiments, the battery bank includes an inverter configured to transform electrical energy collected by the PV panel into AC current for the first compressor.

In some embodiments, the fan coil provides at least 5.5 kW of cooling per hour to the hot air leaving the second three-way valve.

In some embodiments, the PCM tank, the first compressor, the first condenser, and the evaporator are all connected by a first pipe network; and the EG flow unit, the air handling unit, and the air conditioning (AC) unit are all connected by a second pipe network.

In some embodiments, the first pipe network is insulated with a first insulating material to avoid overheating and the second pipe network is insulated with a second insulating material to minimize heat gain of the PCM.

In some embodiments, the system further includes a first controller electrically connected to the PV panel and is configured to monitor electrical energy transfer to the first compressor.

In some embodiments, the system further includes a second controller electrically connected to the PCM tank and configured to handle switching operations during a cooling supply.

In some embodiments, the system further includes a data acquisition unit to record measurement data. In some embodiments, the data acquisition unit further includes thermocouples, flow meters, solar radiation sensors, wind speed meters, current sensors, and voltage sensors to record the measurement data.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1:
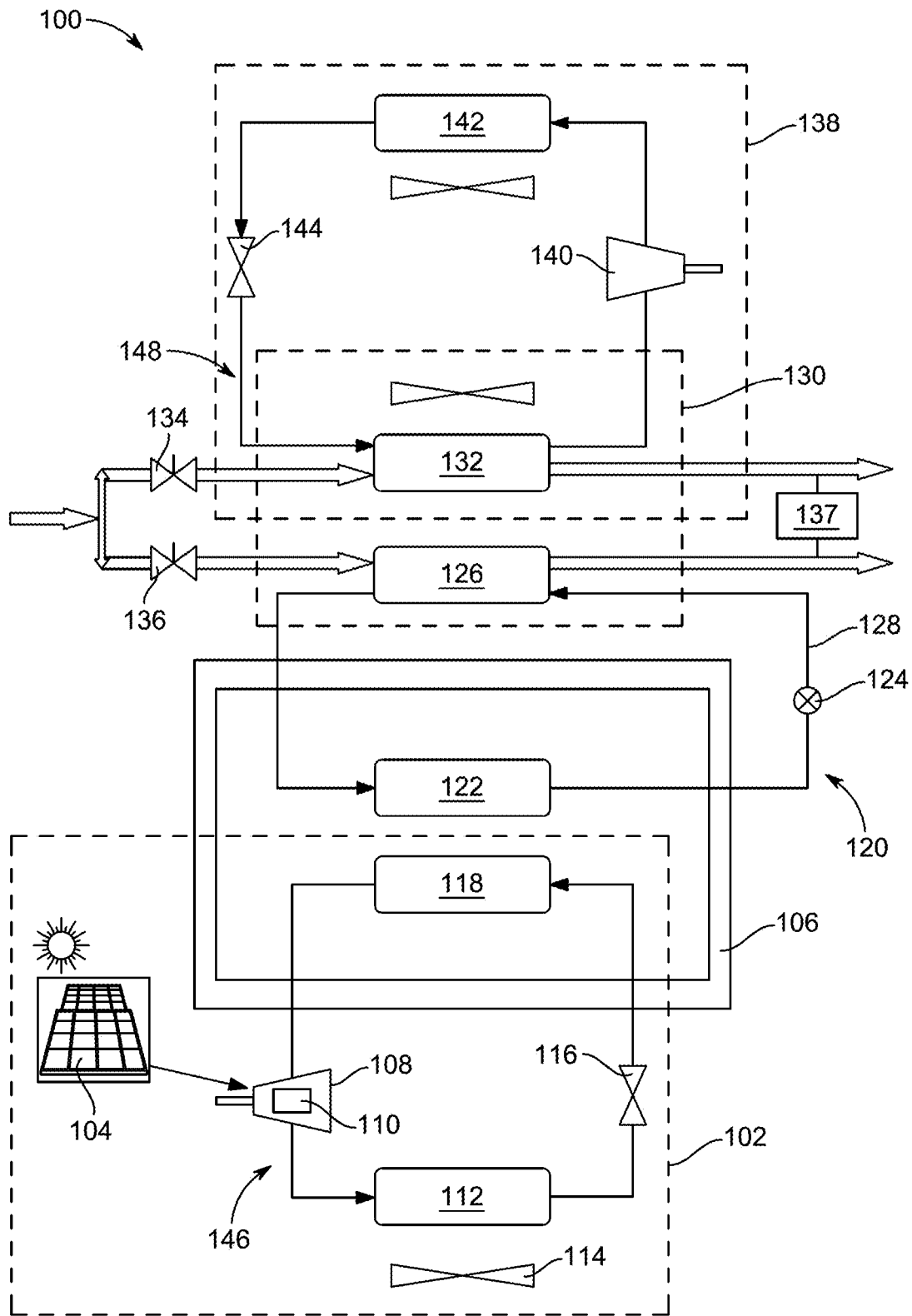
FIG. 1 illustrates a schematic diagram of a solar photovoltaic powered phase change material thermal energy storage (SPCMBOX) system, according to an aspect of the present disclosure.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The term "latent heat" as used herein, refers to the energy absorbed or released by a substance during a change in its physical state, wherein said change occurs without a corresponding change in its temperature. One or more substances having high latent heat may be used for energy storage which include acetic acid, acetone, alcohol (ethyl or methyl), aluminum, ammonia, aniline, benzene, bismuth, carbon dioxide, carbon tetrachloride, decane, dodecane, ethyl ether, ethylene glycol, glycerin, heptane, hexane, naphthalene, octane, paraffin, phenol, and water.

The term "PCM" or "Phase Change Material" as used herein, refers to those substances which can absorb or release a large amount of latent heat, as defined herein, when they go through a change in their physical state, i.e., from one physical state to other physical state and vice-versa. Non-limiting examples of PCMs include paraffin-based materials, acids, sugars, sulfates, chlorides, nitrates, hydroxides, fatty acids, alcohols, and glycols.

FIG. 1 illustrates a schematic diagram of a solar photovoltaic powered phase change material thermal energy storage (SPCMBOX) system (hereinafter referred to as "the system 100"), according to an embodiment of the present disclosure. The system 100 includes a refrigerator unit 102 having a photovoltaic (PV) panel 104, a phase change material (PCM) tank 106, a first compressor 108, a refrigeration pump 110 housed within the first compressor 108, a first condenser 112, a cooling fan assembly 114 positioned proximal to the first condenser 112, a first expansion valve 116, and an evaporator 118. The first condenser 112 is in fluid communication with the evaporator 118 by circulation of the refrigerant from the evaporator 118 to the first condenser 112 via the refrigeration pump 110. In some embodiments, the PCM tank 106 contains between 2 liters (L) and 100 L of PCM material, preferably between 10 L and 90 L, preferably between 20 L and 80 L, preferably between 30 L and 70 L, preferably between 40 L and 60 L, or 50 L of PCM material. In some embodiments, the PCM tank 106 is substantially rectangular. In some embodiments, the PCM tank 106 is triangular, pentagonal, hexagonal, circular, or other polygonal shapes. In some embodiments, the first compressor 108 requires a power ranging from 1000 Watts (W) to 10,000 W, preferably 2,000 W to 9,000 W, preferably 3,000 W to 8,000 W, preferably 4,000 W to 7,000 W, preferably 5,000 W to 6,000 W, or 5,500 W. In some embodiments, the first compressor 108 operates with a condensing temperature range from 20° C. to 40° C., preferably 22.5° C. to 37.5° C., preferably 25° C. to 35° C., preferably 27.5° C. to 32.5° C., or 30° C. In some embodiments, the refrigeration pump 110 can accommodate a flow rate of from 5 gallon/minute to 40 gal/min, preferably 10 gal/min to 35 gal/min, preferably 15 gal/min to 30 gal/min, preferably 20 gal/min to 25 gal/min, or 22.5 gal/min. In some embodiments, the refrigeration pump 110 requires a power of 3000 Watts (W) to 15,000 W, preferably 4,000 W to 14,000 W, preferably 5,000 W to 13,000 W, preferably 6,000 W to 12,000 W, preferably 7,000 W to 11,000 W, preferably 8,000 W to 10,000 W, or 9,000 W. In some embodiments, the first condenser 112 can accommodate a flow rate of from 1 gallon/minute to 20 gal/min, preferably 2 gal/min to 18 gal/min, preferably 4 gal/min to 16 gal/min, preferably 6 gal/min to 14 gal/min, preferably 8 gal/min to 12 gal/min, or 10 gal/min. In some embodiments, the first condenser 112 can accommodate temperatures ranging from 10° C. to 50° C., preferably 12.5° C. to 47.5° C., preferably 15° C. to 45° C., preferably 17.5° C. to 42.5° C., preferably 20° C. to 40° C., preferably 22.5° C. to 37.5° C., preferably 25° C. to 35° C., preferably 27.5° C. to 32.5° C., or 30° C. In some embodiments, the cooling fan assembly contains between 2 and 20 individual fans housed together in the assembly, preferably between 4 and 18 fans, preferably between 6 and 16 fans, preferably between 8 and 14 fans, or 10 fans. In some embodiments, the first expansion valve 116 can accommodate pressures ranging from between 50 pounds per square inch (psi) to 500 psi, preferably 100 psi to 450 psi, preferably 150 psi to 400 psi, preferably 200 psi to 350 psi, preferably 250 psi to 300 psi, or 275 psi. In some embodiments, the evaporator 118 contains chilled water tubes made out of steel, PVC, metal, plastic, iron, or alloys. In some embodiments, the tubes of the evaporator have a diameter of from 10 mm to 100 mm, preferably 20 mm to 90 mm, preferably 30 mm to 80 mm preferably 40 mm to 70 mm preferably 50 mm to 60 mm, or 55 mm. In some embodiments, the refrigerant travels from PCM tank 106 to the first compressor 108, then to first condenser 112, then to evaporator 118, defining one full cycle in the refrigerator unit. In some embodiments, the refrigerant pumped is recycled in the loop between 2 and 30 times, preferably between 5 and 25 times, preferably between 10 and 20 times, or 15 times recycled through the loop. In some embodiments, the refrigerant is returned to the PCM tank 106 without recycling in the refrigerator unit loop. In some embodiments, a cooling coil (not shown) may be disposed within the evaporator 118 to receive the refrigerant from the first condenser 112. In some embodiments, the cooling coil is constructed out of copper, nickel, aluminum, iron, brass, bronze, gold, or any other conductive metal.

The system 100 further includes an ethylene glycol (EG) flow unit 120 having a heat exchanger 122, a pump (not shown), and a fan coil 126 connected in an order via an EG loop 128. In some embodiments, the heat exchanger 122 is a fin and tube heat exchanger, double tube heat exchanger, a shell and tube heat exchanger, a tube in tube heat exchanger, or a plate heat exchanger. In some embodiments, the pump can accommodate a flow rate of from 5 gallon/minute to 40 gal/min, preferably 10 gal/min to 35 gal/min, preferably 15 gal/min to 30 gal/min, preferably 20 gal/min to 25 gal/min, or 22.5 gal/min. In some embodiments, the refrigeration pump 110 requires a power of 3000 Watts (W) to 15,000 W, preferably 4,000 W to 14,000 W, preferably 5,000 W to 13,000 W, preferably 6,000 W to 12,000 W, preferably 7,000 W to 11,000 W, preferably 8,000 W to 10,000 W, or 9,000 W. In some embodiments, the fan coil 126 is constructed out of copper, nickel, aluminum, iron, brass, bronze, or any other conductive metal. In some embodiments, the fan coil 126 contains between 2 and 20 coils/kinks to effectively provide cooling, preferably between 4 and 18, preferably between 6 and 16, preferably between 8 and 14, or 10 coils/kinks. In some embodiments, the PCM tank 104 provides refrigerant for both the EG flow unit 120 and the refrigeration unit 102. In some embodiments, the EG flow unit 120 uses a water-ethylene-glycol mixture as the refrigerant. The system 100 further includes an air handling unit 130 having an air-conditioner (AC) evaporator 132, a first three-way valve 134, and a second three-way valve 136. The first three-way valve 134 directs hot air through the AC evaporator 132 and the second three-way valve 136 directs hot air through the fan coil 126 as shown in FIG. 1. In some embodiments, the first three-way valve 114 can accommodate pressures ranging from between 50 pounds per square inch (psi) to 500 psi, preferably 100 psi to 450 psi, preferably 150 psi to 400 psi, preferably 200 psi to 350 psi, preferably 250 psi to 300 psi, or 275 psi. In some embodiments, the second three-way valve 136 can accommodate pressures ranging from between 50 pounds per square inch (psi) to 500 psi, preferably 100 psi to 450 psi, preferably 150 psi to 400 psi, preferably 200 psi to 350 psi, preferably 250 psi to 300 psi, or 275 psi. In some embodiments, the fan coil 126 is configured to provide at least 5.5 kW of cooling per hour to the hot air supplied thereto through the second three-way valve 136, preferably at least 6 kW, preferably at least 10 kW, preferably at least 15 kW, or 20 kW of cooling per hour. In some embodiments, the AC evaporator 132 contains chilled water tubes made out of steel, PVC, metal, plastic, iron, or alloys. In some embodiments, the tubes of the AC evaporator 132 have a diameter of from 10 mm to 100 mm, preferably 20 mm to 90 mm, preferably 30 mm to 80 mm preferably 40 mm to 70 mm preferably 50 mm to 60 mm, or 55 mm. In some embodiments, a temperature sensor 137 may be attached to an outlet of the air handling unit 130 to measure temperature of air streams exiting therefrom. Particularly, the temperature sensor 137 may be coupled to cold air streams as shown in FIG. 1 to measure temperature of the air passing through the cold air streams.

The system 100 further includes an air conditioning (AC) unit 138 having a second compressor 140, a second condenser 142, and a second expansion valve 144. In some embodiments, the second compressor 140 requires a power ranging from 1000 Watts (W) to 10,000 W, preferably 2,000 W to 9,000 W, preferably 3,000 W to 8,000 W, preferably 4,000 W to 7,000 W, preferably 5,000 W to 6,000 W, or 5,500 W. In some embodiments, the first compressor 108 operates with a condensing temperature range from 20° C. to 40° C., preferably 22.5° C. to 37.5° C., preferably 25° C. to 35° C., preferably 27.5° C. to 32.5° C., or 30° C. In some embodiments, the second condenser 142 can accommodate a flow rate of from 1 gallon/minute to 20 gal/min, preferably 2 gal/min to 18 gal/min, preferably 4 gal/min to 16 gal/min, preferably 6 gal/min to 14 gal/min, preferably 8 gal/min to 12 gal/min, or 10 gal/min. In some embodiments, the second condenser 142 can accommodate temperatures ranging from 10° C. to 50° C., preferably 12.5° C. to 47.5° C., preferably 15° C. to 45° C., preferably 17.5° C. to 42.5° C., preferably 20° C. to 40° C., preferably 22.5° C. to 37.5° C., preferably 25° C. to 35° C., preferably 27.5° C. to 32.5° C., or 30° C. In some embodiments, the second expansion valve 144 can accommodate pressures ranging from between 50 pounds per square inch (psi) to 500 psi, preferably 100 psi to 450 psi, preferably 150 psi to 400 psi, preferably 200 psi to 350 psi, preferably 250 psi to 300 psi, or 275 psi. In an embodiment, the PCM tank 106, the first compressor 108, the first condenser 112, and the evaporator 118 are all connected by a first pipe network 146 while the EG flow unit 120, the air handling unit 130, and the AC unit 138 are all connected by a second pipe network 148. In some embodiments, the first pipe network 146 is insulated with a first insulating material to avoid overheating and the second pipe network 148 is insulated with a second insulating material to minimize heat gain of a PCM stored in the PCM tank 106. In some embodiments, each of the first insulating material and the second insulating material may be one of or a combination of fiberglass, mineral wool (such as rock wool or slag wool), cellulose (such as, but not limited to cotton, sheep's wool, straw, and hemp), natural fibers, polystyrene (such as molded expanded polystyrene (MEPS) or expanded polystyrene (EPS)), polyisocyanurate, polyurethane, perlite, cementitious foam, phenolic foam, insulation facings (such as radiant barriers).

Figure 2:
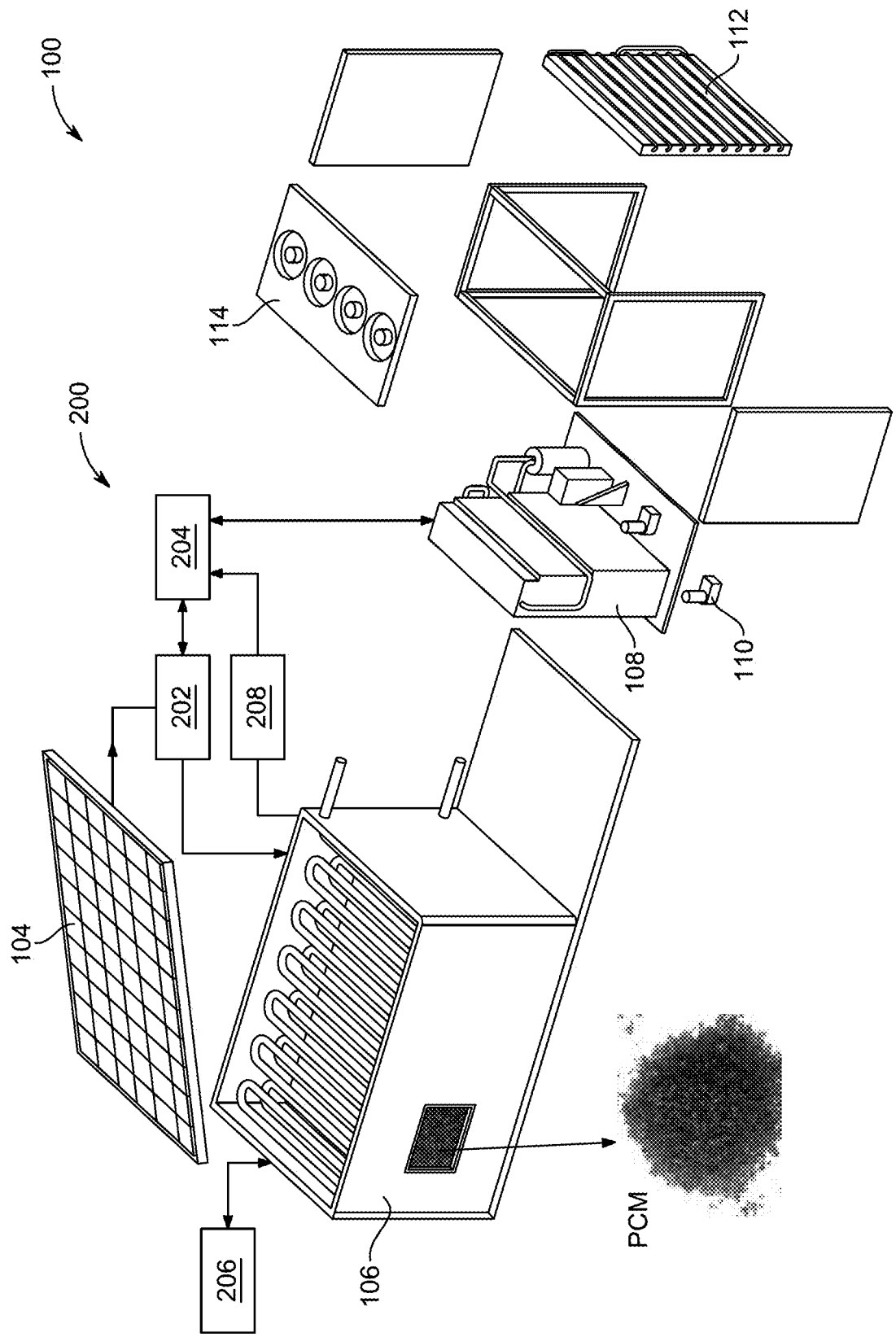
FIG. 2 illustrates a schematic diagram of the SPCMBOX system associated with a portion of the system of FIG. 1, according to an aspect of the present disclosure.

FIG. 2 illustrates a control segment 200 associated with a portion of the system 100, according to an embodiment of the present disclosure. FIG. 2 also partially illustrates an exploded view of a portion of the refrigerator unit 102. The PCM tank 106 is in thermal communication with the first condenser 112, via the first pipe network 146 (see FIG. 1) and is configured to flow the refrigerant from the PCM tank 106 to the first condenser 112 via the refrigeration pump 110. The PV panel 104 is directly adjacent and covers a top side of the PCM tank 106. The PV panel 104 provides electrical energy to the first compressor 108. In some embodiments, the PV panel 104 comprises at least 10 photovoltaic cells, preferably at least 15 cells, preferably at least 20 cells, preferably at least 25 cells, or 30 cells. The PV panel 104 provides heat to the PCM tank 106 through an electrical connection between the PV panel and a resistive heater within the PCM tank 106, as shown in FIG. 2. The heat provided to the resistive heater within the PCM tank 106 is further used to melt the PCM material. The PV panel 104 is used to supply electricity to the first compressor 108 in the refrigerator unit 102. The refrigerator unit 102 is designed in such a way that as PCM starts melting, cold refrigerant from refrigerator unit 102 start circulating through the coil in the PCM tank 102, with energy supplied from the PV panel 104.

In an embodiment, the refrigerator unit 102 further includes a battery bank 202 electrically connected to the PV panel and configured to maintain stability in energy supply during operation. In some embodiments, the battery bank 202 may include an inverter (not shown) configured to transform electrical energy collected by the PV panel 104 into AC current for the first compressor 108.

The system 100 may further include a first controller 204 electrically connected to the PV panel 104 and configured to monitor electrical energy transfer to the first compressor 108. In some embodiments, as shown in FIG. 2, the PV panel 104 may be electrically connected to the first compressor 108 via the battery bank 202 and the first controller 204. In such an arrangement, the electrical energy generated by the PV panel 104 based on incident solar radiation may be supplied to the battery bank 202 where the inverter therein converts direct current from the electrical energy into the AC current suitable for the first compressor 108. Since the AC current is supplied to the first compressor 108 via the first controller 204, the electrical energy transfer to the first compressor 108 may be monitored and controlled accordingly. Similarly, the electrical energy to the refrigerator unit 102 may be supplied via the battery bank 202. In some embodiments, the system 100 may further include a second controller 206 electrically connected to the PCM tank 106 and configured to handle switching operations during a cooling supply. The switching operations are relevant to the time of day, amount of sunlight available, ambient temperature, and other factors related to the external environment surrounding the system 100.

In some embodiments, the system 100 may further include a data acquisition unit configured to record measurement data. In some embodiments, the data acquisition unit may include thermocouples, flow meters, solar radiation sensors, wind speed meters, current sensors, and voltage sensors to record the measurement data. The measurement data includes solar irradiance on the PV panel 104, wind speed, ambient temperature, current and voltage output of the PV panel 104 and the battery bank 202, and power consumption of the AC unit 138.

The PCM tank 106 further includes a refrigeration coil that is immersed in the PCM and configured to circulate the refrigerant through the PCM tank 106 and the first condenser 112. In some embodiments, a thermal energy storage (TES) tank (not shown) may be disposed within the PCM tank 106. In some embodiments, the TES tank occupies between 20% and 60% of the volume of the PCM tank 106, preferably between 30% and 50%, or 40% of the volume of the PCM tank 106. In some embodiments, the TES tank holds the refrigerant and the PCM tank 106 holds the PCM material. In some embodiments, the refrigeration coil may be fabricated of copper and may be housed in the TES tank. In some embodiments, the PCM material is configured to absorb heat from the refrigeration coil to minimize heat gain. In some embodiments, the refrigerant circulates through the refrigeration coil and is configured to absorb heat from the PCM. As such, heat absorbed, or thermal energy produced, during periods of off-peak electrical demand (or usage) may be collected in the TES tank and then withdrawn and distributed to a facility, such as a house or a building, during on peak periods. In some embodiments, the refrigerant used in the TES tank is water. In some embodiments, the water refrigerant contains a percentage of glycol, propylene, or corrosion inhibitors.

In some embodiments, the refrigerant is an ethylene-glycol water solution. In some embodiments, the ethylene-glycol water solution contains an amount of water in a range of about 50 weight percent (wt. %) to about 70 wt. %, preferably between 52 wt. % and 68 wt. %, preferably between 54 wt. % and 66 wt. %, preferably between 56 wt. % and 64 wt. %, preferably between 58 wt. % and 62 wt. %, or 60 wt. % of the ethylene-glycol water solution and an amount of ethylene glycol in a range of about 30 weight percent (wt. %) to about 50 wt. % of the ethylene-glycol water solution, preferably between 32 wt. % and 48 wt. %, preferably between 34 wt. % and 46 wt. %, preferably between 36 wt. % and 44 wt. %, preferably between 38 wt. % and 42 wt. %, or 40 wt. %. In some embodiments, the ethylene-glycol water solution contains at least one component selected from the group consisting of copper oxide, aluminum dioxide, titanium dioxide, silicon dioxide, graphite, silicon carbide, and carbon nanotubes.

In operation, the refrigerant of the refrigerator unit 102 circulates through the refrigeration coil (fabricated of copper) and absorbs heat from the PCM stored in the PCM tank 106, thereby allowing the PCM to solidify. This phase is known as charging phase. When all the PCM is solidified, the second condenser 142 is switched off. During the daytime, when temperature rises, the AC unit 138 is configured to cool the facility and hence power consumption may increase. During the operation of the AC unit 138 in such cooling process, the refrigerant circulating through the AC unit 138 absorbs heat from the facility. The solidified PCM remains in its state until cooling energy is stored within the PCM. In such scenarios, the solidified PCM begins to melt by absorbing heat from the hot refrigerant supplied by the refrigerator unit 102, thereby allowing supply of cold refrigerant in an additional cooling coil (not shown) instead of cooling the facility with the aid of the second compressor 140 of the AC unit 138. The additional coil is disposed inside the evaporator 118 to cool a building space without need of a second compressor 140. A small pump is used to channel cold refrigerant to the additional coil. In some embodiments, between 2 and 6 additional coils can be employed for cooling purposes in the second compressor 140, preferably between 3 and 5 additional coils, or 4 additional coils. In some embodiments, an efficient small pump (not shown) may be used to circulate the cold refrigerant to the additional cooling coil that is installed within the AC evaporator 132. Once the solidified PCM completely melts and changes its phase to liquid, the AC unit 138 may proceed to function normally and cool the facility based on the demand. In an aspect, the melting of the PCM may require about 9 hours to about 12 hours, preferably between 9.5 hours and 11.5 hours, preferably between 10 hours and 11 hours, or 10.5 hours, and such a duration may address cooling requirements within the facility during a major portion of the day.

Subsequently, the PCM is cooled and solidified again by the refrigerator unit 102 that is operated with the aid of the PV panel 104. As the PCM begin to melt, cold refrigerant from the refrigerator unit 102 circulates through the evaporator 118. This may help the TES tank to maintain cold refrigerant and increase operation time from 6-8 hours to 9-12 hours. The refrigerator unit 102 is configured for maximum exchange of energy at all values of ambient and indoor temperature.

Figure 3:
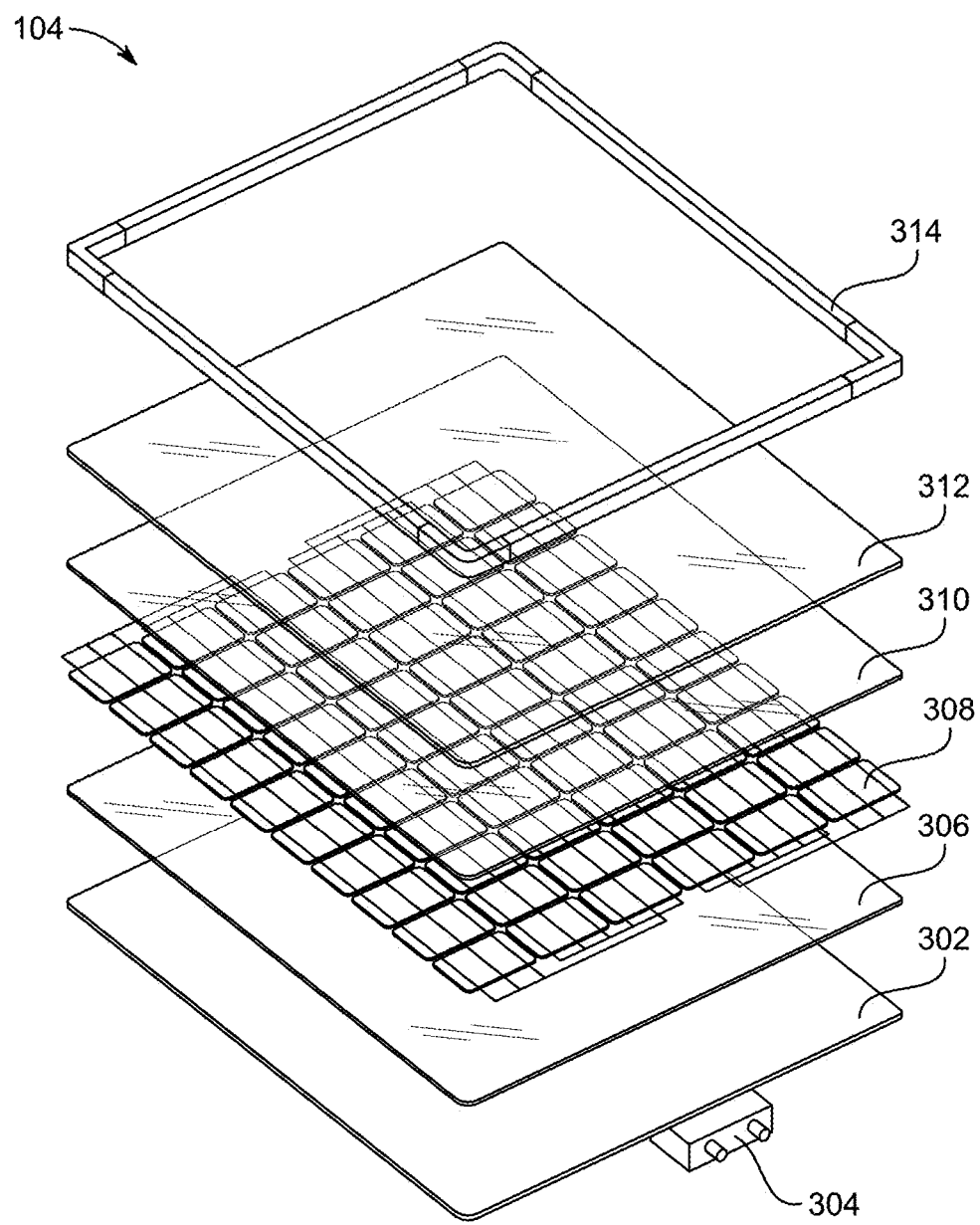
FIG. 3 illustrates an exploded view of a PV panel of the system of FIG. 1, according to an aspect of the present disclosure.

FIG. 3 illustrates an exploded view of the PV panel 104, according to an embodiment of the present disclosure. The PV panel 104 includes a back sheet 302; a junction box 304 coupled beneath the back sheet 302; a first encapsulant ethylene vinyl acetate (EVA) layer 306 that has good radiation transmission and low degradability to sunlight configured to be disposed on the back sheet 302; solar cells 308 configured to be disposed on the first encapsulant EVA layer 306; a second encapsulant EVA layer 310 configured to be disposed on the solar cells 308; a tempered glass 312 configured to be disposed on the second encapsulant EVA layer 310; and an aluminum frame 314 configured to be disposed on the tempered glass 312. In some embodiments, the frame 314 may be copper, bronze, platinum, iron, steel, or other metallic materials. In some embodiments, a PV unit may be used that includes multiple PV panels, each having a configuration of the PV panel 104 described herein. In such arrangement, all the PV panels may be electrically connected to the battery bank 202. In some embodiments, the battery bank 202 may also include multiple capacitors to store the generated electrical energy for later use. In some embodiments, there are between 10 and 30 solar cells 308, preferably between 12 and 28 solar cells, preferably between 14 and 26 solar cells, preferably between 16 and 24 solar cells, preferably between 18 and 22 solar cells, or 20 solar cells 308. In a configuration, the plurality of PV panels 104 are connected in parallel to each other. In another configuration, the plurality of PV panels 104 are connected in series to each other. In other configurations, the plurality of PV panels 104 are connected in both series and in parallel to each other.

Figure 4:
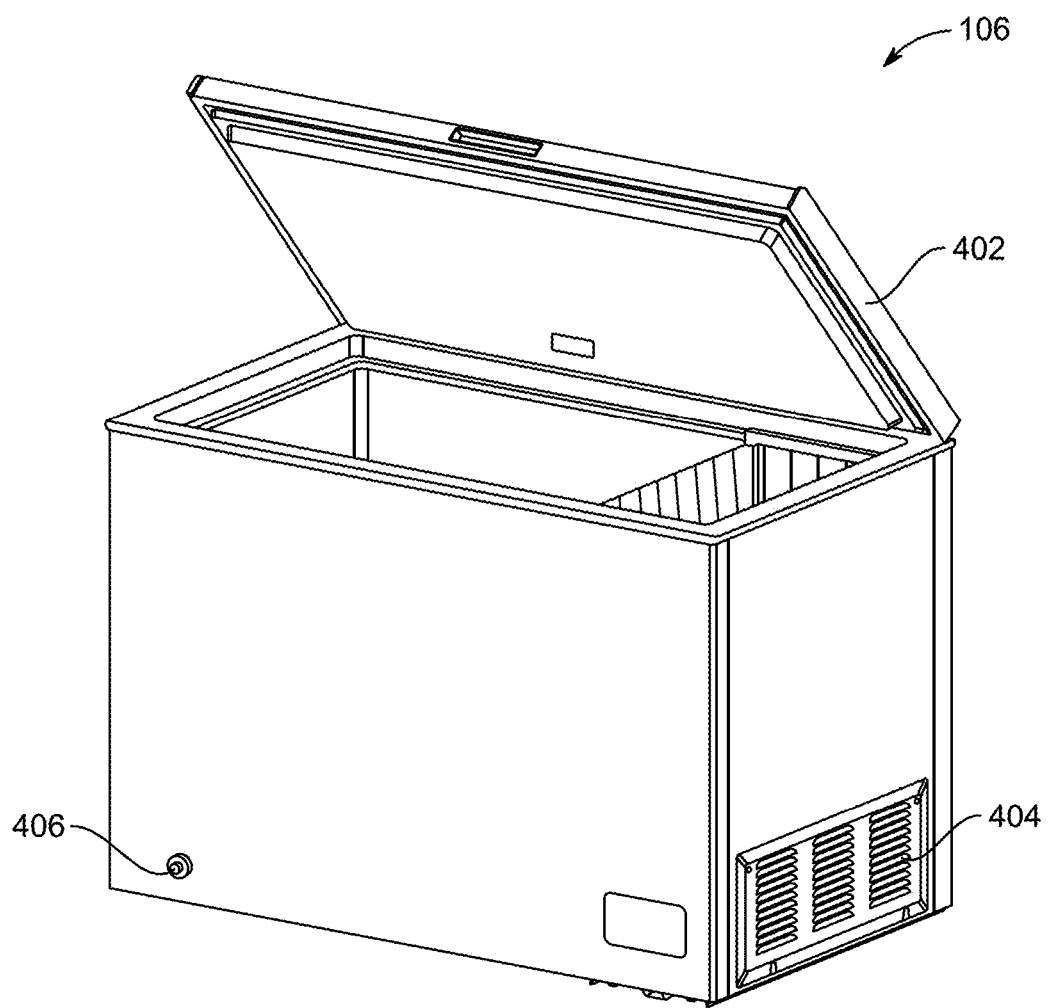
FIG. 4 is an exemplary illustration of a PCM tank of the system of FIG. 1, according to an aspect of the present disclosure.

FIG. 4 is an exemplary illustration of the PCM tank 106, according to an embodiment of the present disclosure. The PCM tank 106 includes a door 402, at least 20 ventilation vents 404 and a drainage passage 406. In some embodiments, an upper external surface of the door 402 may be configured to receive the PV panel 104 and multiple electrical wires may be routed through the door 402 and a cabinet of the PCM tank 106 to allow supply of the electrical energy generated by the PV panel 104. In some embodiments, the door 402 fully closes to seal off the internal material housed within the PCM tank 106 from an external atmosphere. In some embodiments, there are between 10 and 50 ventilation vents 404, preferably between 20 and 40 ventilation vents, or 30 ventilation vents 404. In some embodiments, the ventilation vents 404 are configured to allow heat absorbed or generated within the PCM tank to be purged or released into an external environment. In some embodiments, the ventilation vents 404 are attached to a panel that is positioned at a lower, outer surface of the PCM tank 106. In some embodiments, the panel is welded or screwed into the PCM tank 106 itself. In some embodiments, the drainage passage 406 is also configured to purge excess air from the PCM tank 106. In some embodiments, excess liquid PCM material or refrigerant is purged from the PCM tank 106 through the drainage passage 406 and collected in a container. In some embodiments, the excess material is collected and can be recycled in future operation in the PCM tank 106. In some embodiments, the drainage passage 406 is a substantially cylindrical passage in which the length extends from the inside of the PCM tank 106 to the outside of the PCM tank 106. In some embodiments, the drainage passage has a length ranging from 100 millimeters (mm) to 600 mm, preferably between 200 mm and 500 mm, preferably between 300 mm and 400 mm, or 350 mm in length. In some embodiments, the drainage passage 406 has a diameter ranging from 10 mm to 150 mm, preferably between 25 mm and 125 mm, preferably between 50 mm and 100 mm, or 75 mm in diameter. In some embodiments, a thermostat 208 (see FIG. 2) may be disposed within the PCM tank 106 to monitor a temperature of the PCM within the PCM tank 106. In some embodiments, the thermostat 208 may be coupled to the first controller 204 and the first controller 204 may be configured to receive inputs from the thermostat 208, where the inputs correspond to temperature value of the PCM. Based on the operation and demand of cooling or heating required at the facility, the first controller 204 may be configured to control the supply of electrical energy from the PV panel 104 to the PCM tank 106 during a melting process of the PCM. Alternatively, additional heat gain by the PCM may also be determined by the first controller 204 with the aid of the thermostat 208. In some embodiments, a thermostat installed inside the facility and the thermostat 208 installed in the PCM tank 106 may together control rate of solidification and melting of the PCM. In such arrangement, based on temperature demand from the facility, the first controller 204 may enhance utilization of the PCM in relation to the AC unit 138. For example, based on a desired temperature within the facility, the first controller 204 may be configured to receive inputs from the thermostat installed within the facility and accordingly control supply of electrical energy to the PCM tank 106, thereby controlling the rate of solidification and melting of the PCM and hence the heat transfer between the refrigerant and the PCM. In some embodiments, the first controller 204 may include an interface configured to: (a) work with a notable time arrangement information application, and (b) convey data by utilizing web innovation and browser interface. As such, system 100 may be configured to consume less overall energy and store operate for longer period of time.

In a preferred embodiment of the invention the PCM tank includes a matrix of upwardly extending pencil-like projections fixed to the bottom of the PCM tank. The projections are positioned in an evenly spaced matrix at a density spaced at a distance of 0.2-0.6 preferably 0.3-0.5 times the interior height of the PCM tank. The projections extend upwardly to a total height of 0.6-0.9 times the interior height of the PCM tank. The projections are made of a rigid material such as a thermoplastic and have a diameter, in the case of a circular cross-section, of 2-6 mm, preferably 4-5 mm, or a thickest dimension, in the case of a rectangular cross-section, of 2-6 mm, preferably about 5 mm. The projections serve the purpose of stabilizing the PCM material inside the PCM tank against physical shock. The projections preferably do not contact any coils that are also present in the PCM tank.

Figure 5:
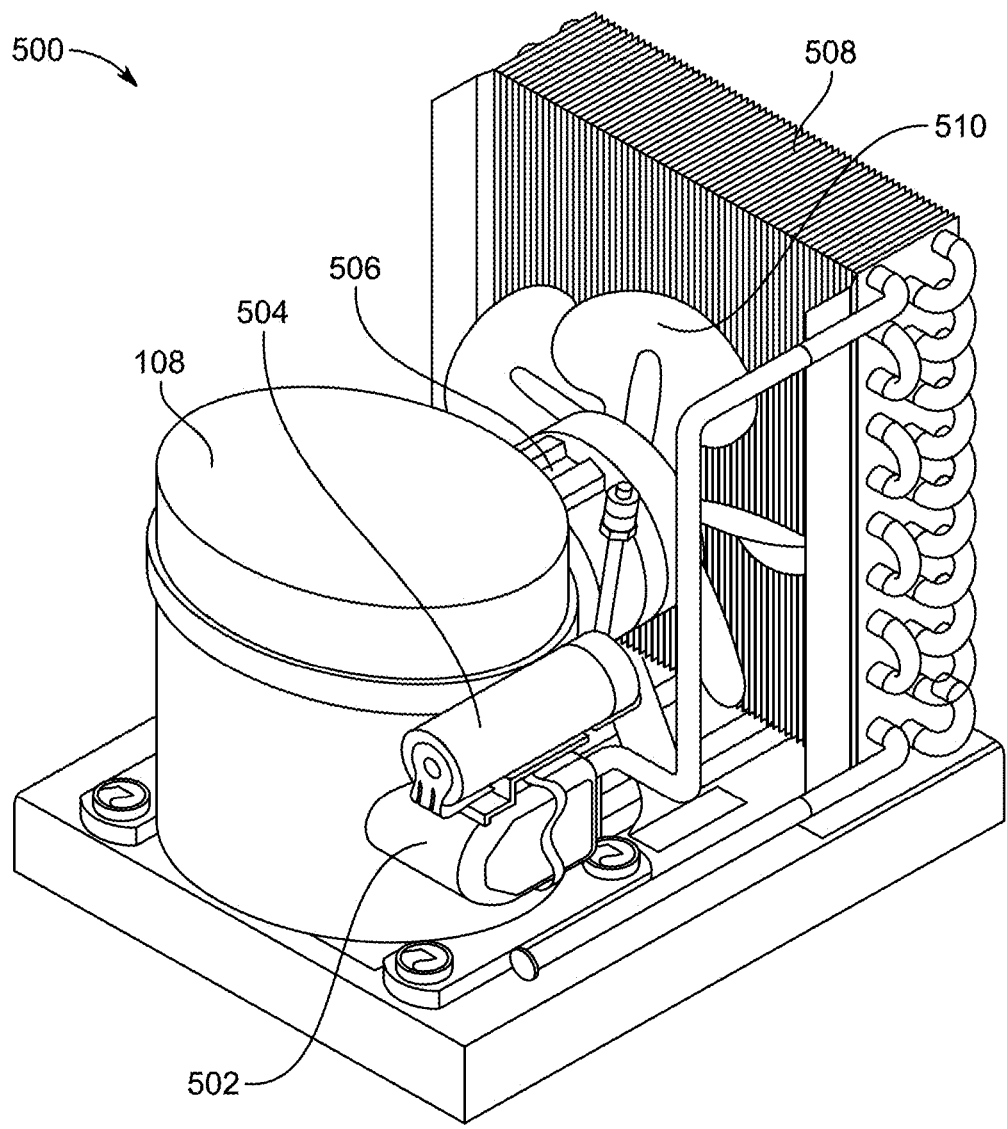
FIG. 5 is an exemplary illustration of a compressor assembly of the system of FIG. 1, according to an aspect of the present disclosure.

FIG. 5 is an exemplary illustration of a compressor assembly 500. The compressor assembly 500 includes a compressor, such as the first compressor 108 or the second compressor 140; a start relay 502; a capacitor 504; a motor fan 506; a condenser coil filter 508; fan blade 510; and a condensate pan (not shown).

Figure 6:
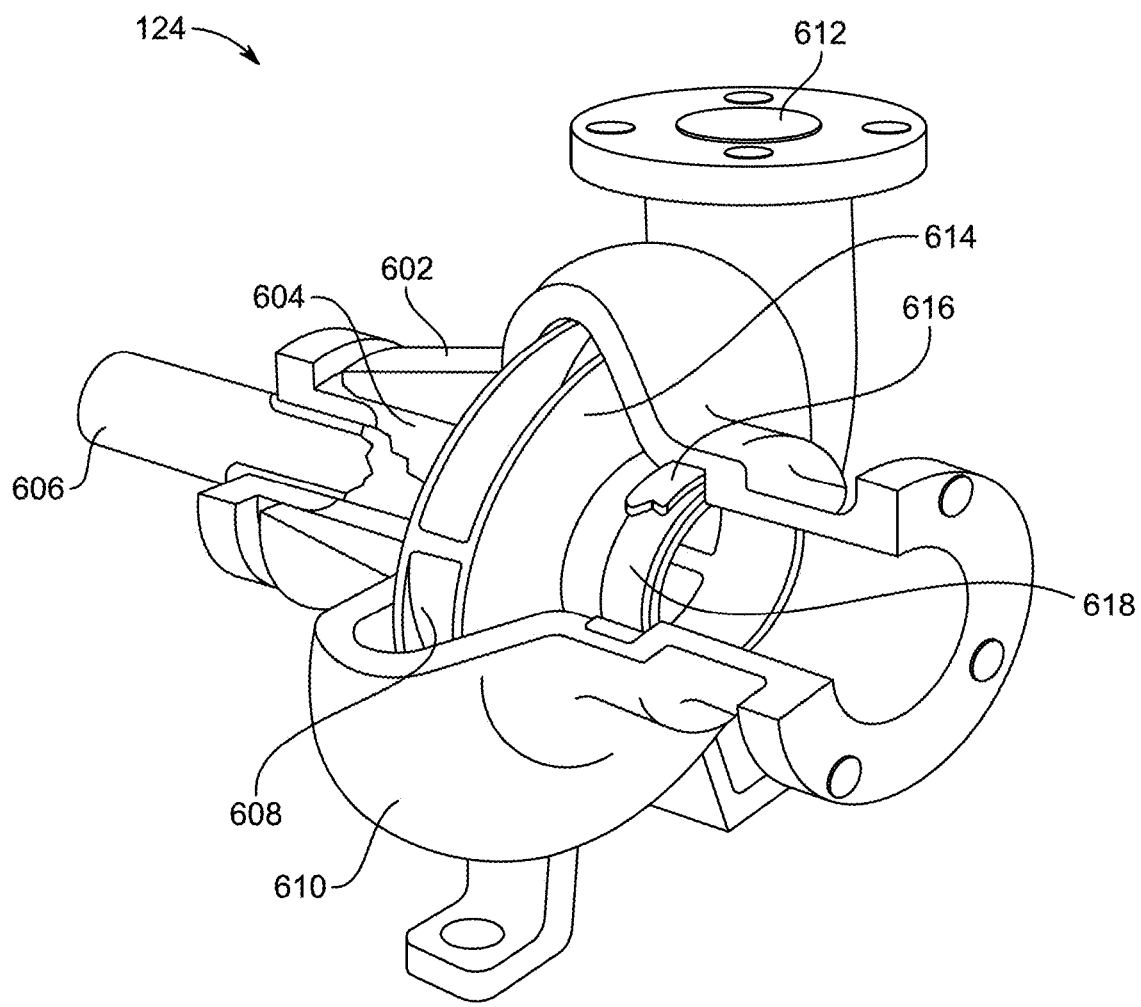
FIG. 6 is an exemplary illustration of a pump of the system of FIG. 1, according to an aspect of the present disclosure.

FIG. 6 is an exemplary illustration of a pump, such as the pump 124 of the EG flow unit 120. In an embodiment, the pump includes a stuffing box 602, a packing material 604, a shaft 606, a blade 608, a volute casing 610, a discharge nozzle 612, an impeller 614, a casing wear ring 616, and an impeller eye 618.

Figure 7:
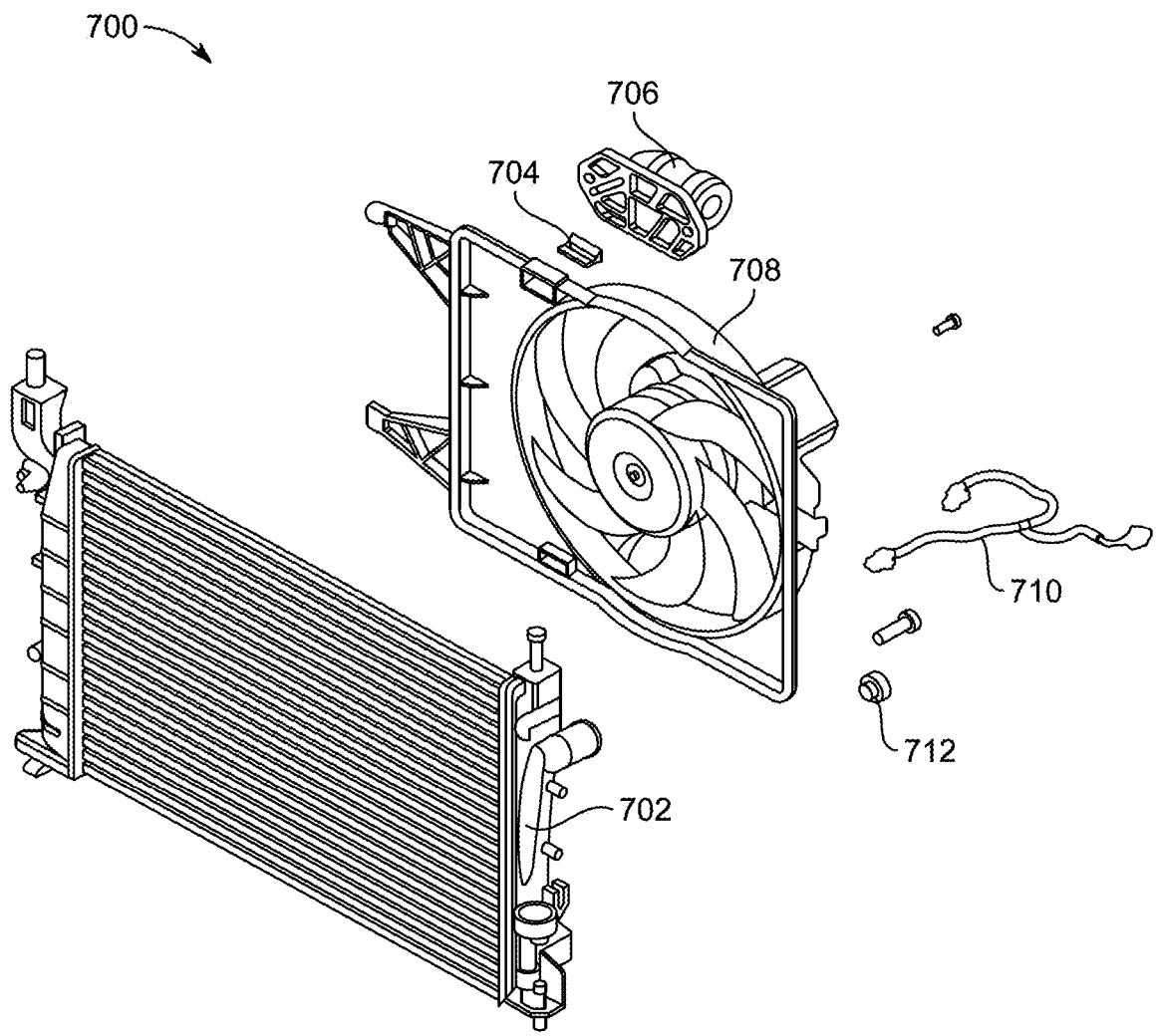
FIG. 7 is an exemplary illustration of a condenser assembly of the system of FIG. 1, according to an aspect of the present disclosure.

FIG. 7 is an exemplary illustration of a condenser assembly 700, according to an embodiment of the present disclosure. The condenser assembly 700 includes a radiator 702, an elastic pad 704, a resistor 706, a radiator fan 708, an electric cable 710, and a pad 712.

EXAMPLE

The components of the system 100 were assembled together through proper piping, such as the first pipe network 146 and the second pipe network 148. The data acquisition unit was integrated to the system 100 in order to record the measurement data. The data acquisition unit included several thermocouples for temperature, flow meters, solar radiation sensor, wind speed meter, current and voltage sensors. All sensors and control signals were connected to the data acquisition unit. During the experimentation, many measurement data sets were recorded, such as solar irradiance, wind speed, ambient temperature, current and voltage output of the PV panel 104 and the battery bank 202, power consumption of the refrigerator unit 102 and the AC unit 138. Other parameters included temperature of the PCM at multiple locations in the PCM tank 106; inlet and exit temperature of the refrigerant as well as its flow rate; inlet and outlet air temperature at the fan coil 126; and room temperature. In these measurements, T-type thermocouples were used for temperatures, a pyranometer was used for solar radiation, a digital multimeter was used for current and voltage, and a wattmeter was used for power consumption. All measurements were monitored and recorded by the data acquisition unit for analysis. Experimental error analysis was carried out using existing engineering approaches.

The system 100 was configured to provide cooling to an office building of about 25 m² with cooling requirement of about 1.5 ton (5.2 kW). As such, design of the system 100 was governed by said cooling requirement. First, a refrigeration system, such as the refrigerator unit 102, with a cooling capacity higher than a space load was selected. The PV panel 104 was designed based on an electrical power requirement of the refrigerator unit 102. The battery bank 202 of a desired capacity was designed and installed to the system 100. The battery bank 202 was used to smooth power input to the refrigerator unit 102 and to provide auxiliary energy during cloudy days. Accordingly, the PCM tank 106 was designed in such a way to be able to provide cooling for an extended period. Different types of PCMs were evaluated for the system 100, which requires temperature in the range of about 5° C. to about 15° C. In order to provide cooling from the PCM tank 106 to the office building, the fan coil 126 was used. The fan coil 126 was configured to be able to provide at least 5.5 kW of cooling. Based on the cooling requirement by the fan coil 126, an appropriate volume of refrigerant to be discharged into the PCM tank 106 was determined. An ethyl-glycol water solution, typically used in chilled-water cooling applications, was used as the refrigerant. Different nanofluids of similar properties may also be used as the refrigerant and performance of each may be evaluated.

Figure 8:
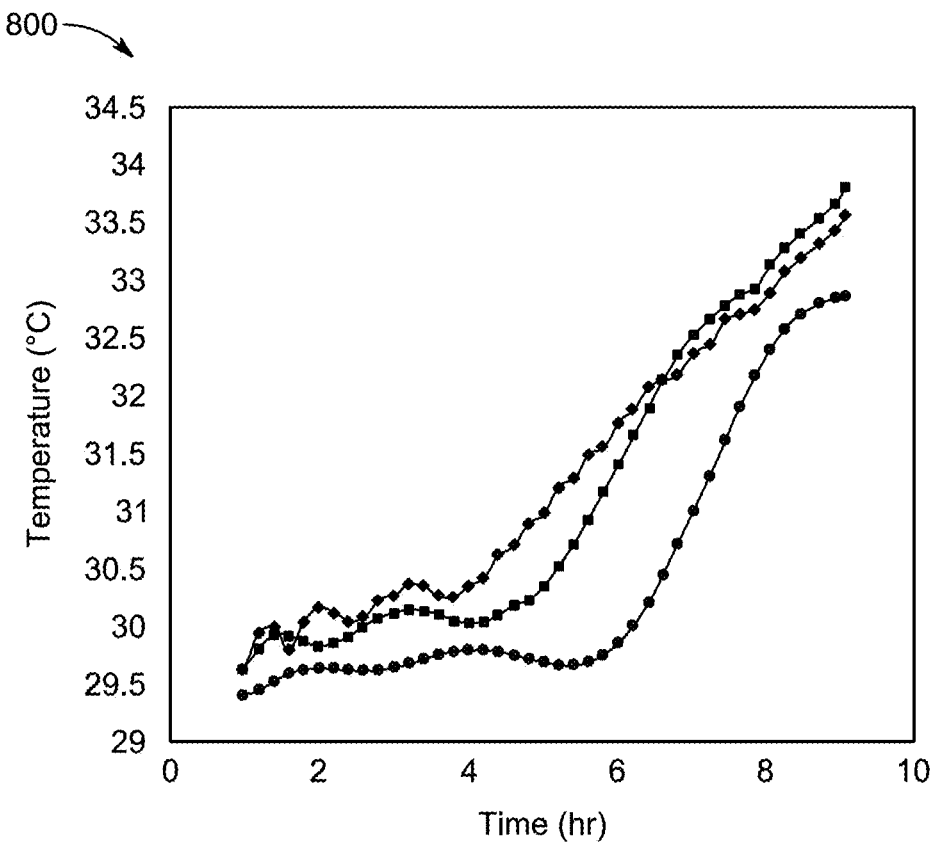
FIG. 8 is a graph depicting time-dependent development of temperature of air exiting the system with varying intake air flow rate at an inlet temperature of 33° C., according to an aspect of the present disclosure.
Figure 9:
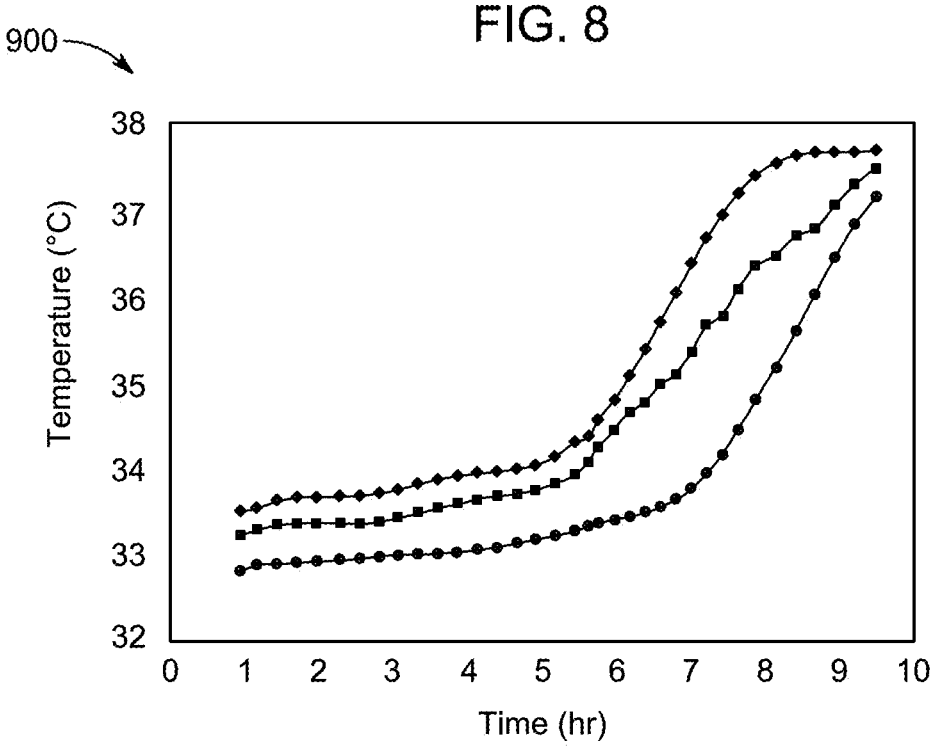
FIG. 9 is a graph depicting time-dependent development of temperature of air exiting the system with varying intake air flow rate at an inlet temperature of 38° C., according to an aspect of the present disclosure.
Figure 10:
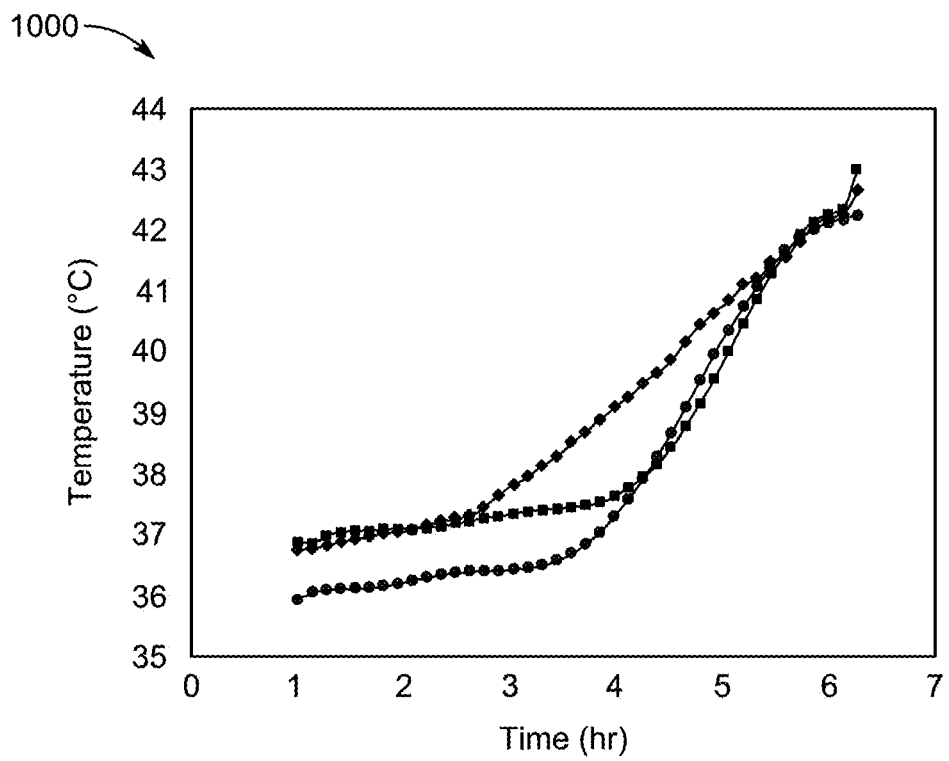
FIG. 10 is a graph depicting time-dependent development of temperature of air exiting the system with varying intake air flow rate at an inlet temperature of 43° C., according to an aspect of the present disclosure.

FIG. 8 illustrates a graph 800 depicting time-dependent development of temperature of air exiting the system 100 with varying intake air flow rate at an inlet temperature of 33° C. FIG. 9 illustrates a graph 900 depicting time-dependent development of temperature of air exiting the system 100 with varying intake air flow rate at an inlet temperature of 38° C. FIG. 10 illustrates a graph 1000 depicting time-dependent development of temperature of air exiting the system 100 with varying intake air flow rate at an inlet temperature of 43° C. The graph plots indicate that when the system 100 approaches steady state, the temperature of the air exiting the system 100 rises and all PCM melts as heat transfer between the PCM and the air passing over them reduces. In addition, the experiment indicated that raising the temperature of the incoming air causes an increase in the temperature of the air exiting the system 100. In addition, despite an increase in the heat transfer coefficient between the air and the PCM, the temperature of the air exiting the system 100 rises with increased input air velocity owing to an increase in air mass flow rate. When air velocity and temperature of intake air decreased, it was observed that time taken between beginning of the cooling process and when the temperature of the exiting air reached the ambient air temperature (complete cooling time, CCT), increased. The CCT may be understood as a duration when the PCM loses all the stored cold energy. As seen in FIG. 8, FIG. 9, and FIG. 10, the temperature of the air exiting the system 100 rises over time since the PCM does not entirely melt, and its temperature remains at a phase transition temperature during this period. A duration for which the PCM remains at a steady temperature before it completely melts is known as complete melting time (CMT). Particularly, it was observed that when the temperature of input air is low, the temperature of output air rises rapidly after the CMT.

The graph plots also indicates that an effect of intake air velocity on the temperature of the output air is almost constant with time, with the exception of last few minutes of operation of the system 100 when variable inlet air temperatures are witnessed. This also indicates that a rate of heat transmission between the PCM and the air is initially greater but is reversed during the melting phase. Such findings may be attributed to the influence of gravity, which initially amplifies the natural convection, resulting in a higher melting rate of the PCM which then decreases with time.

In some embodiments, a number of variables, including intake air velocity and temperature, PCM configuration, PCM material, and PCM amount, may be altered at any time to modify the temperature of output air from the PCM. The temperature of input air is the ambient temperature, which cannot be modified. But the PCM configuration may be altered at an expense. The CMT may be controlled by the first controller 204 based on operation duration of the AC unit 138 operating duration. During peak hours (that is, when greater cooling is required), the first controller 204 may be configured to control the melting process to fulfill the high cooling requirement, thereby minimizing an impact of the peak hours on the overall power consumption of the office building.

Figure 11:
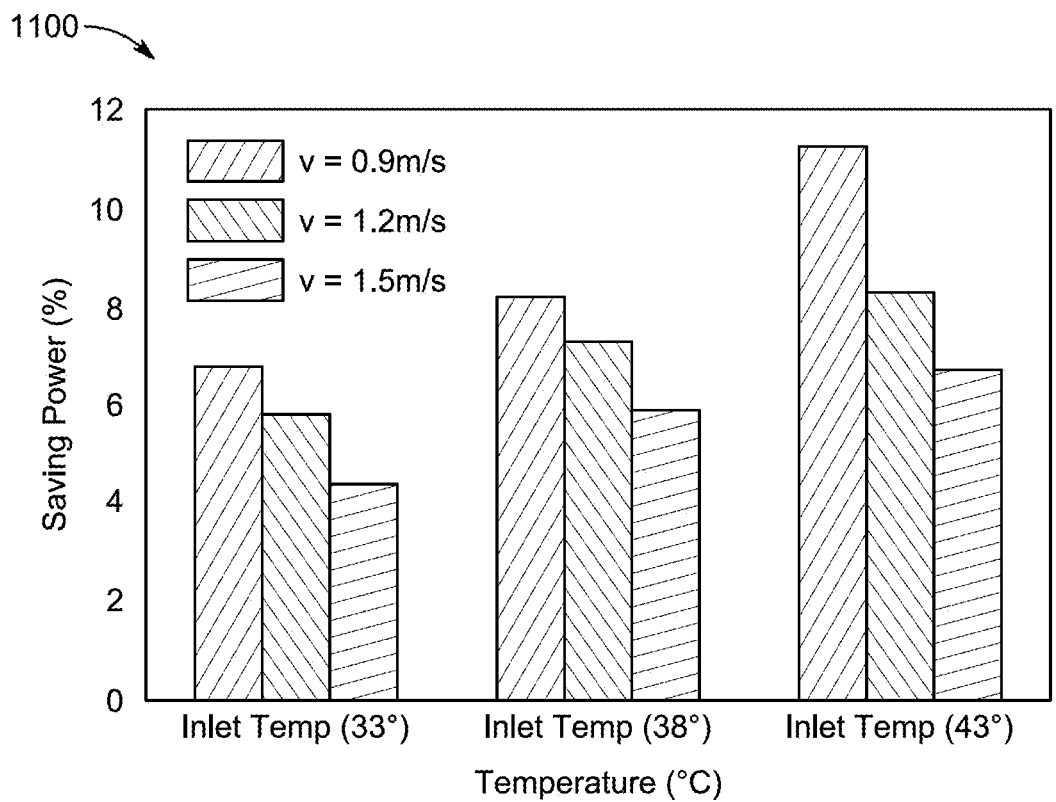
FIG. 11 is a graph depicting a comparative analysis of power saving with reference to inlet temperatures of the air at 33° C., 38° C., and 43° C., according to an aspect of the present disclosure.

FIG. 11 illustrates a graph 1100 depicting a comparative analysis of power saving with reference to inlet temperatures of the air at 33° C., 38° C., and 43° C. Particularly, FIG. 11 illustrates the energy savings per ton of refrigerant over eight hours of operation of the AC unit 138 at three different inlet velocities and three input temperatures, respectively. The findings were compared to those of a traditional AC unit for the same number of operating hours, ambient temperature, and air velocity. In addition, a percentage of energy saved increased when the temperature of input air was increased, since power used by a typical AC unit increases significantly as the ambient temperature rises. Highest percentage of power saving by the AC unit integrated with the system 100 of the present disclosure as compared with to a traditional AC unit, at an input air temperature of 43° C. and at three inlet velocities 0.9 m/s, 1.2 m/s and 1.5 m/s, were around 11.4%, 8.4%, and 6.5%, respectively, as may be observed from FIG. 11. As such, an advantage of increasing intake air velocity may be sufficient for short working hours of the AC unit.

To this end, the present disclosure provides the system 100 capable of being retrofitted with the existing AC units. Such retrofitting may help achieve, a) peak load shifting, b) enhance system reliability, c) reduction in operational cost, d) substituting a cold source if powered by the PV panel 104. As described earlier, the system 100 is operated by the PV panel 104 and provides additional cooling source to existing air conditioning system. Besides supporting for peak load shifting purpose, the system 100 aids the air conditioning system to operate for long durations. The PCM used in the PCM tank aids faster heat transfer rate thereacross, faster heat exchange rate with the heat transfer fluid (such as the refrigerant), and uniform melting/solidification rates. The system 100 is compact in size, efficient, and is associated with high COP and less payback period. In addition, the system 100 reduces energy and greenhouse gases emission; eliminates or defers expensive power transmission; reduces size of air conditioning unit; may be economically viable with less maintenance cost; and may be easily deployable with minimum integration skill.

As used herein, the terms "a" and "an" and the like carry the meaning of "one or more."

Numerous modifications and variations of the present invention are possible in light of the above teachings. It is, therefore, to be understood that, within the scope of the appended claims, the invention may be practiced otherwise than as specifically described herein.

The invention claimed is:

1. A solar photovoltaic powered phase change material thermal energy storage system, comprising:
   a refrigerator unit;

an ethylene glycol (EG) flow unit;
an air handling unit; and
an air conditioning (AC) unit,
wherein the refrigerator unit comprises:
a photovoltaic (PV) panel, a phase change material (PCM) tank, a refrigeration pump, a cooling fan assembly, a first compressor, a first condenser, a first expansion valve, and an evaporator;
wherein the PV panel provides electrical energy to the first compressor to cool a PCM material housed within the PCM tank, wherein the PCM material is selected from the group consisting of a paraffin material, a fatty acid, an alcohol and a glycol;
the PV panel is directly adjacent and covers a top side of the PCM tank;
the PCM tank is in thermal communication with the first condenser through a refrigeration coil and is configured to flow a refrigerant from the PCM tank to the first condenser via the refrigeration pump;
the PCM tank further comprises a door, at least 20 ventilation vents, and a drainage passage;
the refrigeration pump is housed inside a same compartment as the compressor; and
the refrigeration coil in the PCM tank is immersed in the PCM material and configured to circulate the refrigerant to the PCM tank and the first condenser; and
the cooling fan assembly is positioned proximal to the first condenser;
the EG flow unit comprises a heat exchanger, a pump, and a fan coil; and
the air handling unit comprises an AC evaporator and two three-way valves, wherein a first three-way valve directs heated air through the AC evaporator and a second three-way valve directs heated air through the fan coil; and
the AC unit comprises a second compressor, a second condenser, and a second expansion valve.

2. The system of claim 1, wherein the refrigeration coil is fabricated of copper and housed in a thermal energy storage (TES) tank disposed within the PCM tank.

3. The system of claim 1, wherein a thermostat is disposed within the PCM tank to monitor a PCM temperature of the PCM material within the PCM tank.

4. The system of claim 2, wherein the refrigeration coil housed in the TES tank within the PCM tank is configured to absorb heat from the PCM material to minimize heat gain.

5. The system of claim 1, wherein the system further comprises a first controller electrically connected to the PV panel and is configured to monitor electrical energy transfer to the first compressor.

6. The system of claim 1, wherein the system further comprises a second controller electrically connected to the PCM tank and configured to handle switching operations during a cooling supply.

7. The system of claim 1, wherein the refrigerator unit further comprises a battery bank configured to maintain stability in energy supply during operation.

8. The system of claim 7, wherein the battery bank comprises an inverter configured to transform electrical energy collected by the PV panel into AC current for the first compressor.

9. The system of claim 2, wherein the refrigerant circulates through the refrigeration coil and configured to absorb heat from the PCM material within the PCM tank.

10. The system of claim 1, wherein the first condenser is in fluid communication with the evaporator by circulating the refrigerant from the first condenser to the evaporator via the refrigeration pump.

11. The system of claim 10, wherein a cooling coil is disposed within the evaporator to receive the refrigerant from the first condenser.

12. The system of claim 1, wherein the fan coil is configured to provide at least 5.5 kW of cooling per hour to the heated air leaving the second three-way valve.

13. The system of claim 1, wherein the refrigerant is an ethylene-glycol water solution.

14. The system of claim 13, wherein the ethylene-glycol water solution contains an amount of water of from 50 weight percent (wt. %) to 70 wt. % of the ethylene-glycol water solution and an amount of ethylene glycol of from 30 weight percent (wt. %) to 50 wt. % of the ethylene-glycol water solution.

15. The system of claim 1, wherein the PCM tank, first compressor, first condenser, and evaporator are all connected by a first pipe network; and
the refrigerator unit, the EG flow unit, the air handling unit, and the air conditioning (AC) unit are all connected by a second pipe network.

16. The system of claim 15, wherein the first pipe network is insulated with a first insulating material to avoid overheating and the second pipe network is insulated with a second insulating material to minimize heat gain of the PCM material.

17. The system of claim 1, wherein the system further comprises a data acquisition unit configured to record measurement data.

18. The system of claim 17, wherein the data acquisition system further comprises thermocouples, flow meters, solar radiation sensors, wind speed meters, current sensors, and voltage sensors to record the measurement data.

19. The system of claim 1, wherein a temperature sensor is attached to an outlet of the air handling unit to measure an exiting temperature of an air stream from the air-handling unit.

20. The system of claim 13, wherein the ethylene-glycol water solution contains at least one component selected from the group consisting of copper oxide, aluminum dioxide, titanium dioxide, silicon dioxide, graphite, silicon carbide, and carbon nanotubes.

* * * * *